(12) United States Patent
Challoner et al.

(10) Patent No.: US 6,467,346 B1
(45) Date of Patent: Oct. 22, 2002

(54) CORIOLIS SENSOR INTERFACE

(75) Inventors: A. Dorian Challoner, Manhatttan Beach, CA (US); Roman C. Gutierrez, La Crescenta, CA (US)

(73) Assignees: Hughes Electronics Corporation, El Segundo, CA (US); California Institute of Technology, Pasadena, CA (US)

( * ) Notice: Subject to any disclaimer, the term of this patent is extended or adjusted under 35 U.S.C. 154(b) by 60 days.

(21) Appl. No.: 09/593,880

(22) Filed: Jun. 14, 2000

(51) Int. Cl.[7] .............................................. G01P 19/00
(52) U.S. Cl. .................................. 73/504.02; 73/504.12
(58) Field of Search ........................ 73/504.12, 504.14, 73/504.15, 504.16, 504.04, 504.02

(56) References Cited

U.S. PATENT DOCUMENTS 5,047,734 A * 9/1991 Newell et al. ................. 331/46
6,079,272 A * 6/2000 Stell et al. ................ 73/504.12
6,164,134 A * 12/2000 Cargille .................... 73/504.02

* cited by examiner

*Primary Examiner*—Helen Kwok
(74) *Attorney, Agent, or Firm*—Terje Gudmestad

(57) ABSTRACT

An electrical interface (20) for a Coriolis sensor (10, 11, 13) having an independent, non-zero bias voltage $V_b$ and a plurality of transresistance amplifiers that are referenced to ground. The electrical interface (20) may be used for both a cloverleaf microgyroscope (10, 11) and a hemispherical resonator gyroscope (13). The electrical interface (20) of the present invention reduces the complexity of the control electronics (50) required to control the Coriolis sensor (10, 11, 13) and allows a combination of analog and digital electronics thereby reducing the cost of the Coriolis sensor (10, 11, 13) and its associated control electronics (50).

14 Claims, 3 Drawing Sheets

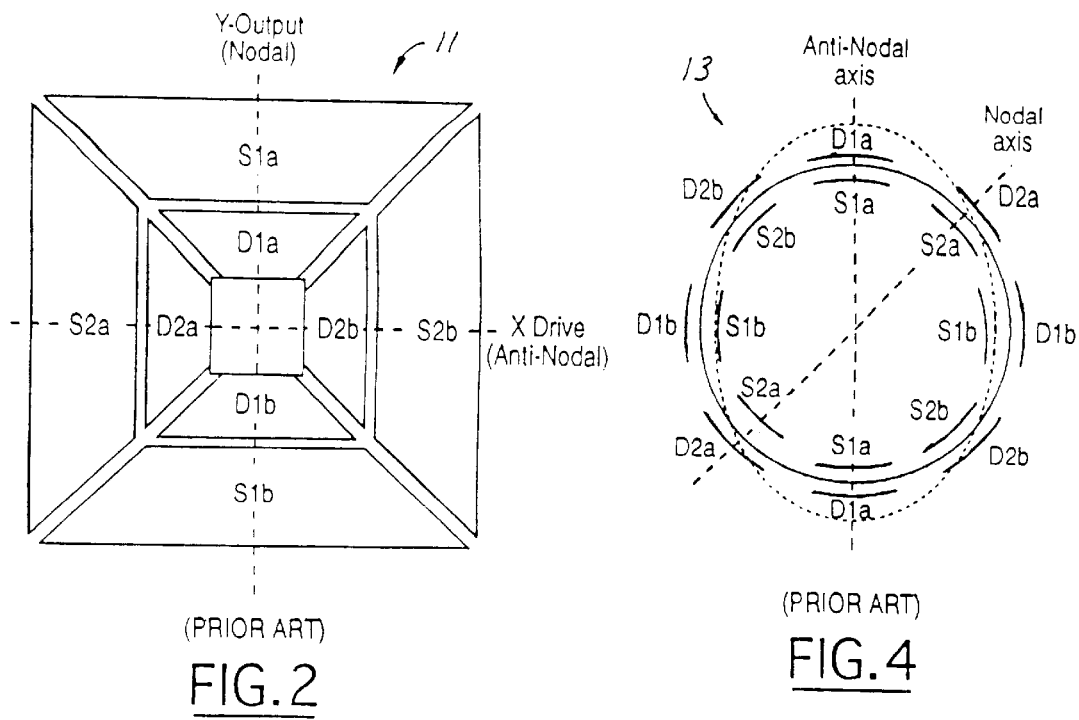
(PRIOR ART)
FIG. 2
(PRIOR ART)
FIG. 4
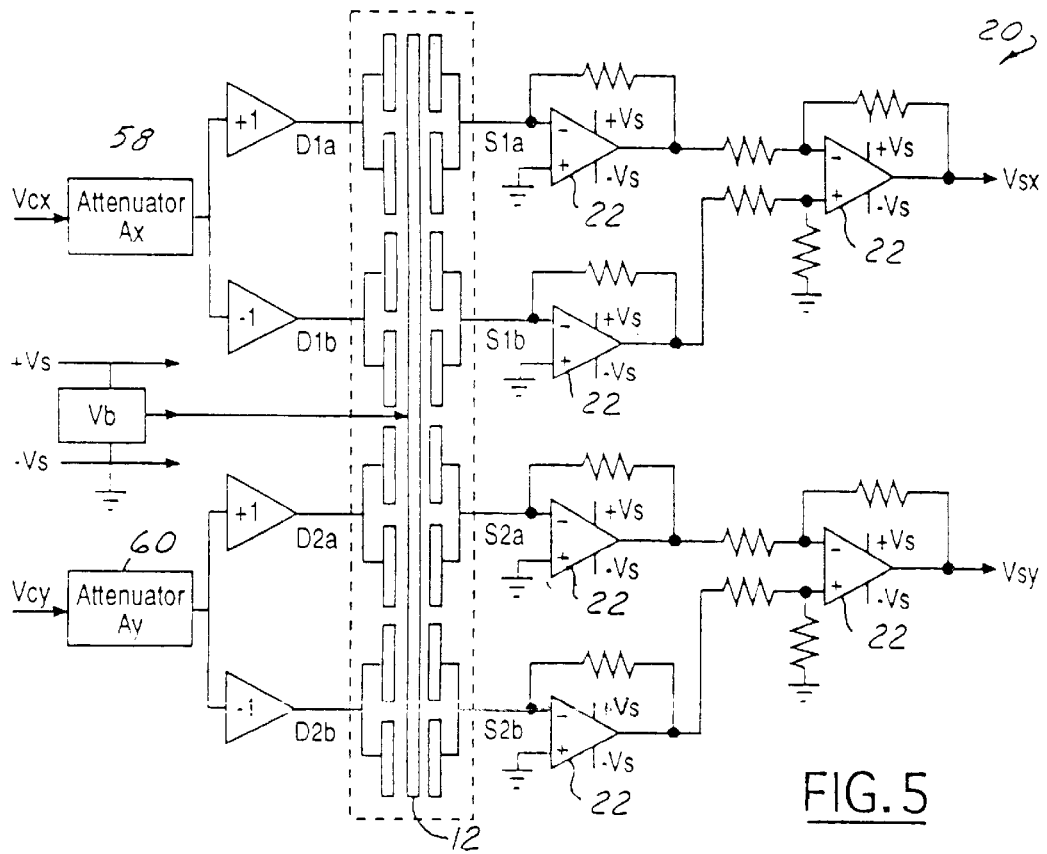
FIG. 5

CORIOLIS SENSOR INTERFACE

GOVERNMENT INTEREST

This invention was made with government support. The government has certain rights in this invention.

TECHNICAL FIELD

The present invention relates to a Coriolis sensor interface, and more particularly to a method of biasing and sensing the resonator for a Coriolis sensor.

BACKGROUND ART

Resonator gyroscopes are used in many applications including, but not limited to, communications, control and navigation systems for both space and land applications. These highly specialized applications require high performance and cost effective gyroscopes.

In a vibratory gyroscope, the Coriolis effect induces energy transfer from the driver input vibratory mode to another mode which is sensed or output during rotation of the gyroscope. Examples of vibratory gyroscopes include a "cloverleaf" gyroscope and a hemispherical resonator gyroscope.

The cloverleaf gyroscope is explained and described in a technical paper entitled "Silicon Bulk Micro-machined Vibratory Gyroscope" presented in June, 1996 at the Solid State Sensors and Actuator Workshop in Hilton Head, S.C.

The micro-machined electromechanical gyroscope has a resonator having a "cloverleaf" structure consisting of a rim, four silicon leaves, and four soft supports, or cantilevers, made from a single. crystal silicon. The four supports provide mechanical support and restoring force for the harmonic motion of the structure. A post is rigidly attached to the center of the resonator, in a plane perpendicular to the plane of the silicon leaves, and to a quartz base plate spaced apart from the silicon leaves. The quartz base plate has a pattern of electrodes that coincides with the cloverleaf pattern of the silicon leaves. The electrodes include two drive electrodes and two sense electrodes. The post provides large Coriolis coupling that transfers energy between the two orthogonal rocking modes.

The control electronics associated with the cloverleaf micro-gyroscope includes an electrically grounded resonator. A resonator bias voltage is applied to the sense and control electrodes. The bias voltage is limited to allow sufficient dynamic range for each amplifier which is limited by supply voltages.

Simple transresistance sense amplifiers are referenced to the resonator bias voltage. The sum of the bias voltage and signal dynamic range is limited by the amplifier power supply voltage.

The HRG is described and explained in a technical paper entitled; "A Micromachined Vibratory Ring Gyroscope", by M. W. Putty, and K. Najafi, Solid State Sensor and Actuator Workshop, Hilton Head, S.C., June, 1994.

The HRG is made of quartz and has a shell resonator design. Three hemispherical shells are used as vibratory elements to detect rotation about three mutually orthogonal axes. It is immune to external vibration and is capable of standing high g shocks.

The HRG has an independently biased resonator. However, it uses a complex bootstrap buffer for capacitive sensing. This method of sensing does not produce a voltage proportional to the resonator velocity, resulting in more complex and expensive control electronics to derive signals in phase with velocity from position. The HRG has four control loops which use multiple demodulators, modulators and a phase lock loop.

All of the signal processing for the cloverleaf gyroscope and the HRG is done with analog components. The selected components have a high radiation tolerance for space.

In general, the signals from the sense electrodes are summed to remove the differential signal between them and the response of the sense resonance from the feedback loop. On the other hand, the sense circuit subtracts the signals from the sense electrodes to remove the common-mode drive signal.

Micro-gyroscopes are subject to electrical interference that degrades performance with regard to drift and scale factor stability. Micro-gyroscopes often operate the drive and sense signals at the same frequency to allow for simple electronic circuits. However, the use of a common frequency for both functions allows the relatively powerful drive signal to inadvertently electrically couple to the relatively weak sense signal.

Typically, prior art micro-gyroscopes are open loop and untuned. If the drive frequency is tuned closely to a high Q sense axis resonance, large mechanical gain and low sensitivity to sensor noise is possible. High Q also results in low rate drift.

However, close tuning leads to large uncertainty in the gain and phase of the open-loop response. Phase variations lead to added rate drift errors due to quadrature signal pickup and the gain variations lead to rate scale factor errors. Operating the open-loop micro-gyroscope in a closely tuned manner results in higher scale factor error, higher rate errors due to mechanical phase shifts, and slower response with sensitive lightly damped resonances. Additionally, the response time of the open-loop micro-gyroscope is proportional to the damping time constant, Q, of the sense resonance. To reduce rate drift, very long natural damping time constants are required, slowing the response time.

If the drive frequency is tuned closely to a high Q sense axis resonance, a force-to-rebalance method that incorporates complex demodulators and modulators in multiple re-balance loops is necessary. The modulators and demodulators provide coherent feedback only for signals modulating the drive frequency, and therefore do not provide active damping of independent sense resonance vibrations. These vibrations, if not exactly matched to the drive frequency, are not actively damped resulting in false rate signals or noise.

Noise and drift in the electronic circuit limit microgyroscope performance. Therefore, prior art microgyroscopes perform poorly and are unreliable in sensitive space applications.

Previous open loop operation is intentionally split between two rocking mode frequencies. The rocking mode axes tend to align with the spring axes, electrode sense axes and electrode control axes. Closed loop control enables close tuning of the rocking modes. However, residual imbalances result in non-alignment of rocking mode axes with electrode axes. This produces a large quadrature error signal and second harmonics on the output axis sensor which limits the amount of amplification and closed loop gain that can be applied. The large quadrature error signal also causes false rate indications due to phase errors in the demodulation. The lack of tuning of the two modes due to mismatch of the spring reduces the sensor mechanical gain and increases rate noise.

SUMMARY OF THE INVENTION

The present invention is a common electrical interface and control method for both the silicon cloverleaf microgyroscope and the quartz HRG wherein the vibrating resonator is excited with a dc bias voltage and the rate of change in electrode capacitance is directly sensed by transimpedance amplifiers. The result is capacitive motion sensor outputs for the drive and output axis have lower noise, larger dynamic range and are proportional to the resonator velocity.

The velocity sensing permits simple agc drive axis control and direct wideband control of the output axis. Wideband control provides robust damping and control of the output axis resonance reducing sensitivity to external disturbances.

In the present invention, mixed analog and digital components in a common control loop will have reduced cost integrated circuit implementation. The cloverleaf micro-gyroscope and the HRG can share the same control electronics. The result is a reduction in the cost of development of low-cost space gyroscopes for a wide range of performance.

It is an object of the present invention to maximize the available bias voltage and maximize the available dynamic signal range for the sense and control functions. It is another object of the present invention to increase the rate scale factor, rate resolution and dynamic range of the micro-gyroscope. It is a further object of the present invention to simplify the control electronics.

Other objects and features of the present invention will become apparent when viewed in light of the detailed description of the preferred embodiment when taken in conjunction with the attached drawings and appended claims.

BRIEF DESCRIPTION OF THE DRAWINGS

In order that the invention may be well understood, there will now be described, an embodiment thereof, given by way of example, reference being made to the accompanying drawings, in which:

FIG. 2 is anagram of a prior art micro-electromechanical cloverleaf micro-gyroscope having eight electrodes;

FIG. 4 is a diagram of a typical prior art electrode pattern for a HRG;

FIG. 5 is a block diagram of an electrical interface of the present invention that can be used for both a cloverleaf micro-gyroscope and an HRG;

BEST MODE(S) FOR CARRYING OUT THE INVENTION

In general, vibratory micro-gyroscopes have a rotation sensing mechanical element that is initially driven to oscillate in an input, or drive mode. Under rotation, Coriolis acceleration induces energy transfer from the input mode to a second oscillatory mode, typically termed an output or sense mode, which causes the sensing element to be excited. Optimum performance is achieved when the oscillatory modes, the drive and sense modes, have the same resonant frequency and a high quality, or Q factor. The response to the Coriolis acceleration is then mechanically amplified by the Q factor of the resonance.

Figure 1:
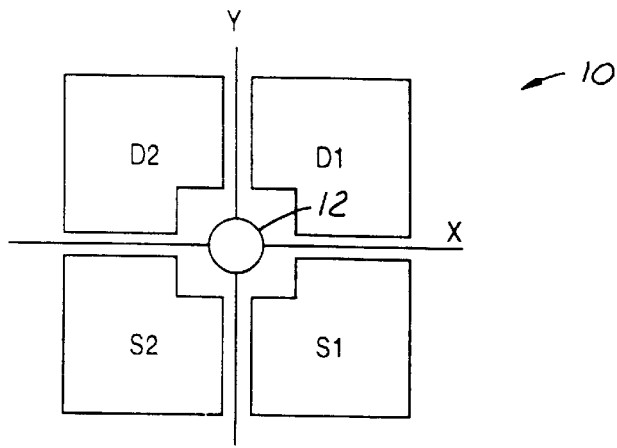
FIG. 1 is a diagram of a prior art micro-electromechanical cloverleaf micro-gyroscope having four electrodes.

FIG. 1 is a prior art cloverleaf micro-gyroscope 10 having four electrodes, D2, D2, S1 and S2. It should be noted that while a four-leaf micro-gyroscope is described herein by way of example, it is also possible to substitute another symmetric, planar pattern. For example, a six or eight leaf clover pattern may be used, or another more complex pattern. For example, in FIG. 2 there is shown an eight-electrode pattern 11. Electrodes D1a, D1b, D2a, D2b, S1a, S1b, S2a, and S2b are arranged about the drive axis and the output axis.

Referring again to FIG. 1, a set of four electrodes including two drive electrodes, D1 and D2 and two sense electrodes, S1 and S2 are shown. The electrodes D1, D2, S1, and S2 are located beneath silicon cloverleaves, (not shown), that are connected to each other by a resonator 12. The resonator 12 is located perpendicular to the plane of the electrodes D1, D2, S1, and S2. The electrodes D1, D2, S1, and S2 are not electrically connected to the cloverleaves.

Figure 3:
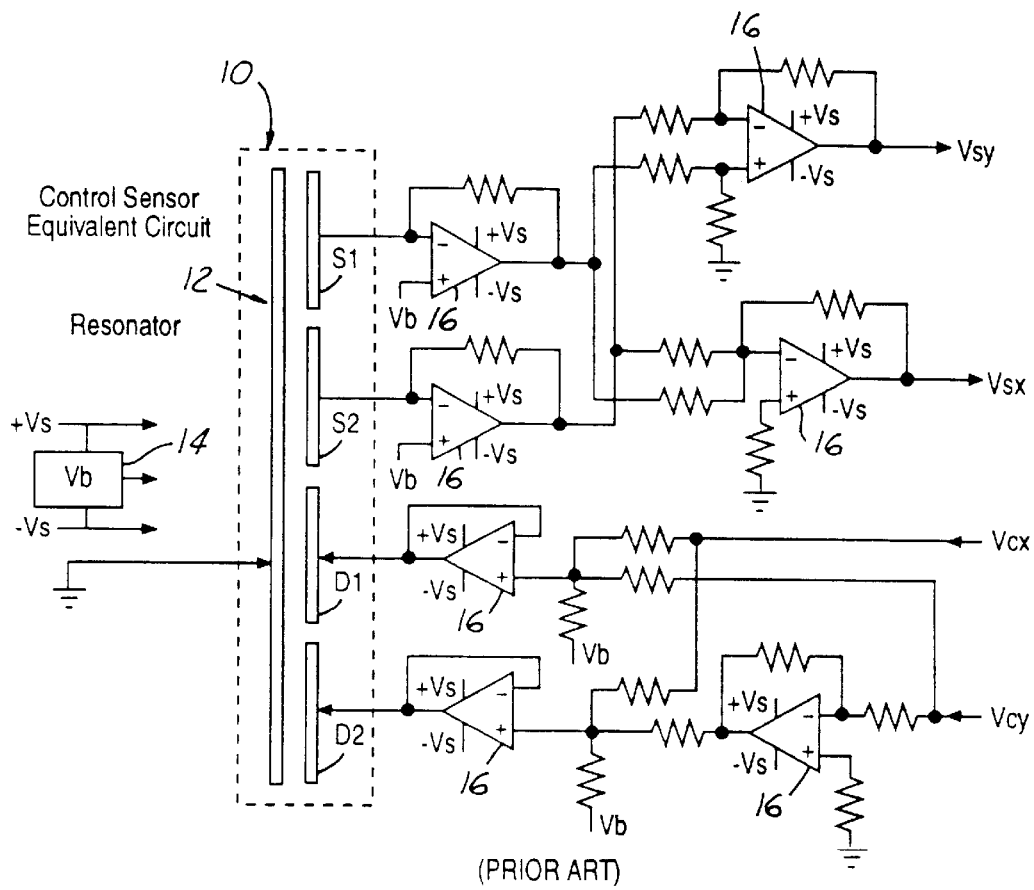
FIG. 3 is a block diagram of prior art electrical interface for the micro-gyroscope shown in FIG. 1.

A prior art electrical interface circuit for the four-electrode cloverleaf micro-gyroscope is shown in block diagram form in FIG. 3. The resonator 12 is grounded and has a bias voltage 14, $V_b$. The electrical interface circuit implements simple transresistance amplifiers 16 at each electrode, D1, D2, S1 and S2. The bias voltage, $V_b$, is typically limited to 5 Volts to allow sufficient dynamic range for each amplifier, which is limited by supply voltages $+V_r/-V_s$, typically ±15 Volts. In the prior art electrical interface shown in FIG. 3, the Coriolis rate sensitivity scales with the square of the bias voltage.

All of the signal processing in the circuit shown in FIG. 3 is done with analog components. The selected components have high radiation tolerance for space.

The prior art electrical interface circuit (not shown) for a typical HRG has an independently biased resonator. However, it employs a complex bootstrap buffer for capacitance sensing. The sensor noise is lower for the same bias voltage. However, this method of sensing does not produce a voltage proportional to the resonator velocity. The result is more complex, and more expensive, control electronics to derive signals in phase with velocity from position. In the prior art electrical interface for the HRG, there are four control loops which use multiple demodulators, modulators and a phase lock loop.

FIG. 4 is a diagram of a typical HRG electrode pattern 13. There are eight electrodes, D1a, D1b, D2a, D2b, S1a, S1b, S2a, and S2b. The electrodes are arranged about nodal and anti-nodal axes as shown in FIG. 4.

The present invention is a common electrical interface 20, which will be described herein with reference to FIG. 5 and how it applies to the HRG in FIG. 4 and the prior art eight-electrode micro-gyroscope shown in FIG. 2.

Referring now to FIG. 5, there is shown the common electrical interface 20 of the present invention. The resonator 12 is shown to have an independent, non-zero bias voltage, Vb. The transresistance amplifiers 22 are referenced to ground. Because there is no limit to the bias voltage, Vb, the sense and actuation gain, which is proportional to the bias voltage, is also limitless. The sense and actuation gain can be significantly increased without limiting the dynamic signal range.

For example, using a bias voltage of 10 Volts, as opposed to 5 Volts in the prior art, there is two times lower rate noise and 50% higher voltage dynamic range. Additionally, two-times higher drive torque is provided for the same drive voltage, or smaller drive electrodes would produce the same drive torque. Smaller drive electrodes would enable the use of larger sense electrodes and further reduce rate noise.

Also, with the present invention it is possible to set the bias voltage to a value much larger than the amplifier supply voltage, $V_s$. For example, $V_b$=100 Volts, as used by the HRG. The present invention retains the desirable direct velocity-sensing attribute of the transresistance amplifier interface used with the cloverleaf micro-gyroscope and, therefore, can be applied to the HRG as well. As mentioned earlier, the prior art HRG interface does not produce a voltage proportional to the resonator velocity, which leads to more complex and expensive control electronics.

Another advantage of the electrical interface 20 of the present invention is the presentation of standard outputs $V_{sx}$, $V_{sy}$ that are proportional to rates about the x (drive or anti-nodal) axis and the y (output or nodal) axis. Also advantageous, is the standard control inputs, $V_{cx}$, $V_{cy}$ that are proportional to torques about the x and y axes in the case of the HRG, and forces along the x and y axes in the case of the cloverleaf micro-gyroscope.

The eight-electrode arrangement of the HRG and the cloverleaf micro-gyroscope provides for differential sense and control on both the x and y axes, yet the resonator bias and power interface and the sense and control signal interface remain the same. Other electrode arrangements with combinations of single-ended and differential signal processing can be similarly implemented with this standard power and rate sense and torque, or force, control interface. One skilled in the art is capable of applying the present invention to other arrangements.

Figure 6:
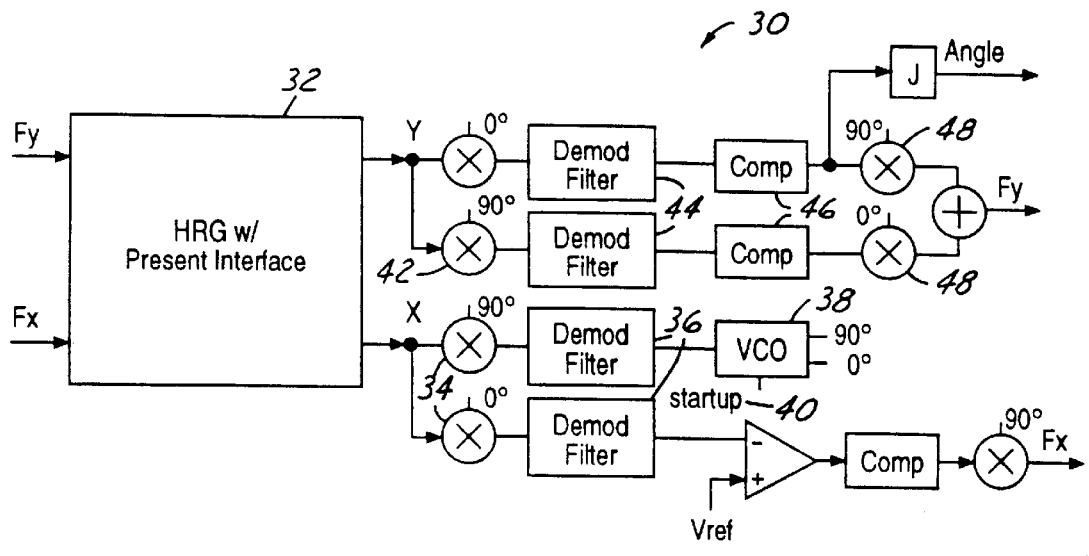
FIG. 6 is a block diagram of a prior art HRG control circuit.

The common interface 20 of the present invention allows for simplification of the control electronics that can be used with both the cloverleaf micro-gyroscope and the HRG. For example, referring to FIG. 6, there is shown an example of a control circuit required with the prior art HRG interface, shown as block 32. The prior art interface 32, for the HRG x axis (drive axis) requires the control circuit 30 has a pair of synchronous detectors 34, or multipliers, demodulating filters 36, a voltage control oscillator 38 and a start-up circuit 40. The y-axis (output axis) requires a pair of synchronous detectors 42, demodulating filters 44, compensators 46 and modulators 48.

The common interface 20 of the present invention has only two simple loops for drive and output axis control. Simpler and fewer loops can be readily implemented using analog or digital electronics, which significantly reduces complexity.

Figure 7:
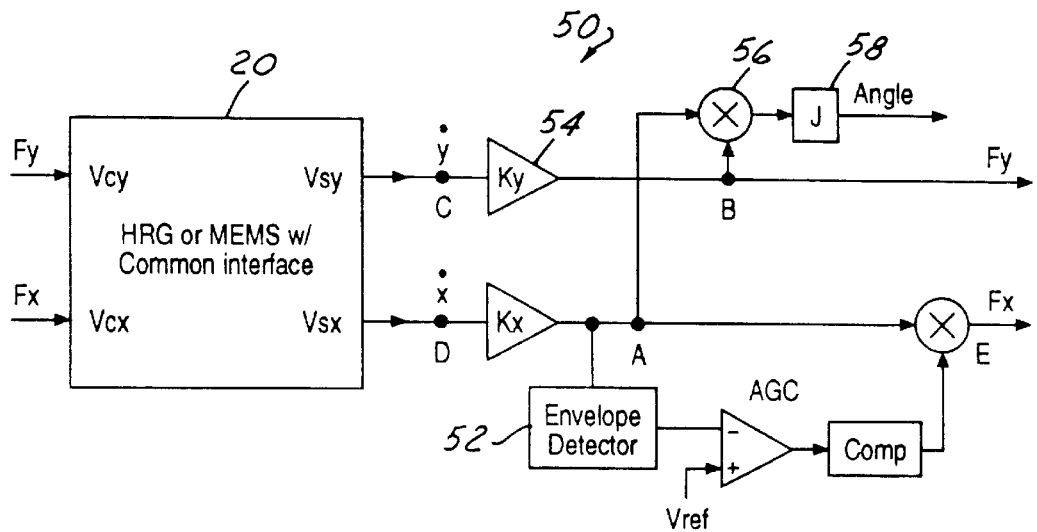
FIG. 7 is a block diagram of the control circuit of the present invention for use with the common electrical interface shown in FIG. 5.

FIG. 7 shows the simplified control electronics 50 that can be used with the common interface 20 of the present invention. For the x, or drive axis, an envelope detector 52 can replace the pair of synchronous detectors, demodulating filters, voltage control oscillator and start up circuit shown in FIG. 6. For the y (or output) axis, a single gain stage 54 and demodulator 56 can replace the pair of synchronous detectors, demodulating filters, compensators and modulators shown in FIG. 6.

An advantage of the common interface 20 of the present invention is that it provides a clearly defined and large amount of active damping of the nodal resonance. Therefore, it may offer better rejection of closely synchronous disturbances from other resonators.

As mentioned earlier with reference to the prior art electrical interface, all of the signal processing is done with analog components. The selected components have high radiation tolerance for space. In using the common interface 20 of the present invention, the resonator connection to ground is replaced with a bias voltage, $V_b$, that can be increased from 5V, i.e. to 10V. Larger values of $V_b$>$V_s$ are possible with an independent voltage source or a voltage multiplier circuit that can operate from ±$V_s$ and produce a stable output $V_b$>$V_s$. The angle output is quantized using an incremental digital interface that depends on an analog integration of the demodulator output that is reset when the integrated value exceeds a fixed threshold. In the present invention, there are not quantization or phase errors due to digitization within either of the control loops. DC voltage drift at the output of the demodulator can be made negligible by increasing the attenuation, as by attenuators 58, 60 in FIG. 5. Correspondingly, the gains $K_x$ and $K_y$ in the control circuit shown in FIG. 7 also need to be increased.

It should be noted that while the present invention is being described in a preferred embodiment. A low cost, low drift implementation is possible at the expense of increased noise due to quantization errors due to sampling delays. For example, in FIG. 7, the signals A and B may be digitized and a digital integration and multiplication could be used. This would eliminate the dc output drift and 1/f noise of the analog multiplier and the sampling delays would not effect the control loops and only add a small delay to the angle output. A highly linear, high-resolution incremental analog-to-digital converter could also be used. Additionally, more of the functions could be digitized for lower cost, but at the expense of increased noise due to quantization. For example, digitization at points E, B and C, D are also possible provided an accounting is made for the sample delay prior to digital demodulation. The sample rate must be several times the resonator frequency to ensure stability.

Therefore, it is possible to modify the present invention without departing from the scope of the appended claims.

What is claimed is:

1. An electrical interface for a control circuit for Coriolis-sensor having a plurality of electrodes and a resonator arranged about x and y axes, said interface comprising:

an independent, non-zero bias voltage, $V_b$, for said resonator;

a plurality of transresistance amplifiers for controlling said plurality of electrodes, said amplifiers having a reference voltage to ground; and said amplifiers have a gain that is proportional to said bias voltage, outputs $V_{sx}$ and $V_{sy}$ are proportional to rates about said x and y axes, and control inputs $V_{cx}$ and $V_{cy}$ are proportional to forces about said x and y axes.

2. The interface as claimed in claim 1 further comprising an attenuator for said x-axis and an attenuator for said y-axis.

3. The interface as claimed in claim 2 wherein said attenuators are adjusted to eliminate quantization and phase errors.

4. The interface as claimed in claim 1 wherein said Coriolis sensor is a cloverleaf microgyroscope.

5. The interface as claimed in claim 4 wherein said cloverleaf microgyroscope has four electrodes.

6. The interface as claimed in claim 4 wherein said cloverleaf microgyroscope has eight electrodes.

7. The interface as claimed in claim 4 wherein said cloverleaf microgyroscope has a plurality of symmetrically spaced electrodes.

8. The interface as claimed in claim 1 wherein said Coriolis sensor is a hemispherical resonator gyroscope.

9. The interface as claimed in claim 1 wherein said control circuit further comprises a combination of analog and digital components.

10. An electrical interface for Coriolis-sensor having a plurality of electrodes and a resonator arranged about x and y axes, said interface comprising:

- an independent, non-zero bias voltage, $V_b$, for said resonator;
- a plurality of transresistance amplifiers for controlling said plurality of electrodes, said amplifiers having a reference voltage to ground;
- a control circuit for controlling said Coriolis sensor; and
- said amplifiers have a gain that is proportional to said bias voltage, outputs $V_{sx}$ and $V_{sy}$ are proportional to rates about said x and y axes, and control inputs $V_{cx}$ and $V_{cy}$ are proportional to forces about said x and y axes.

11. The interface as claimed in claim 10 wherein said control circuit further comprises:

- a first control loop for said x axis having an envelope detector; and
- a second control loop for said y axis having a gain stage and demodulator;
- whereby said control circuit provides active damping of a nodal resonance.

12. The interface as claimed in claim 11 wherein said control circuit further comprises a combination of digital and analog components.

13. The interface as claimed in claim 12 wherein said control circuit further comprises an incremental digital interface for analog integration of a demodulator output whereby quantization and phase errors due to digitization in said control loops are eliminated.

14. The interface as claimed in claim 12 wherein dc output drift and 1/f noise are eliminated by digitizing predetermined signals in said first and second control loops.

* * * * *